March 25, 1924.

B. P. GRAY 1,487,935

APPARATUS FOR SLAUGHTERING CATTLE

Filed Aug. 21, 1923     6 Sheets-Sheet 3

Inventor
Bertram Parrott Gray
By
B. Auger Atty

March 25, 1924.
B. P. GRAY
APPARATUS FOR SLAUGHTERING CATTLE
Filed Aug. 21, 1923 6 Sheets—Sheet 4
1,487,935
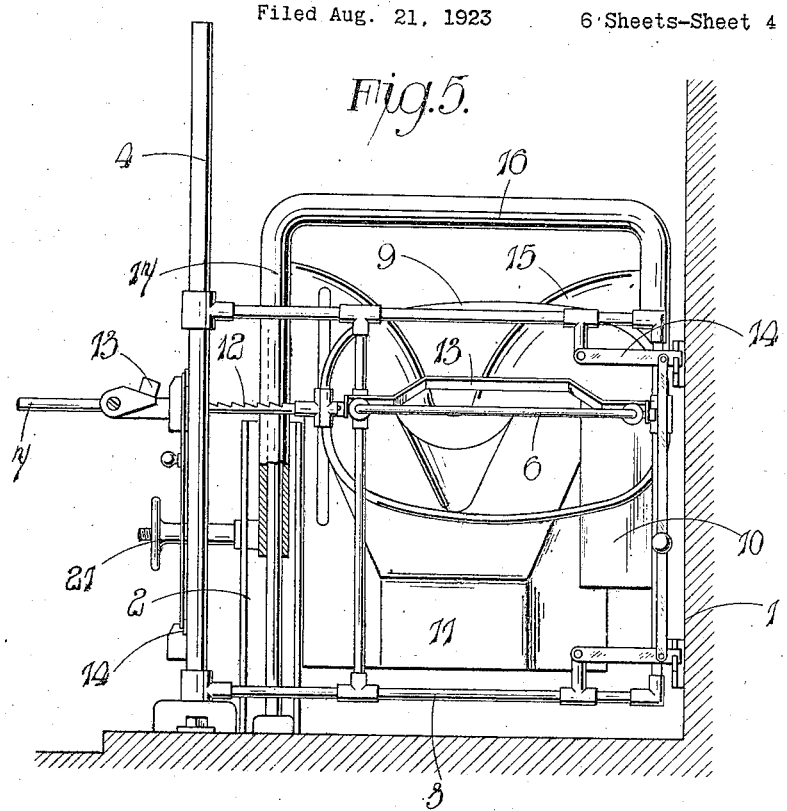
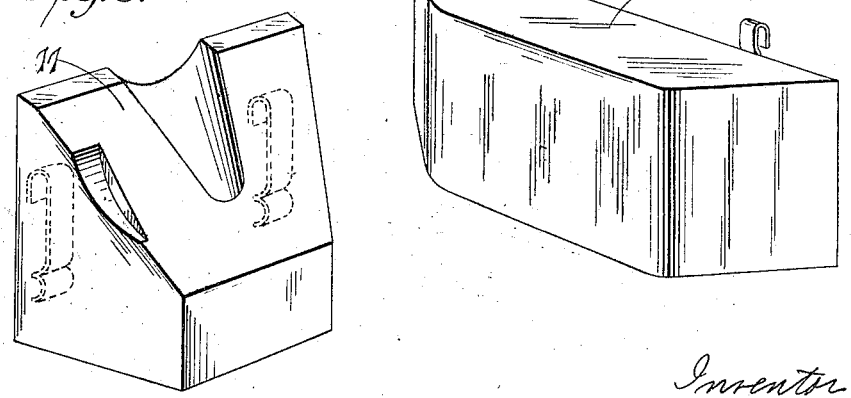

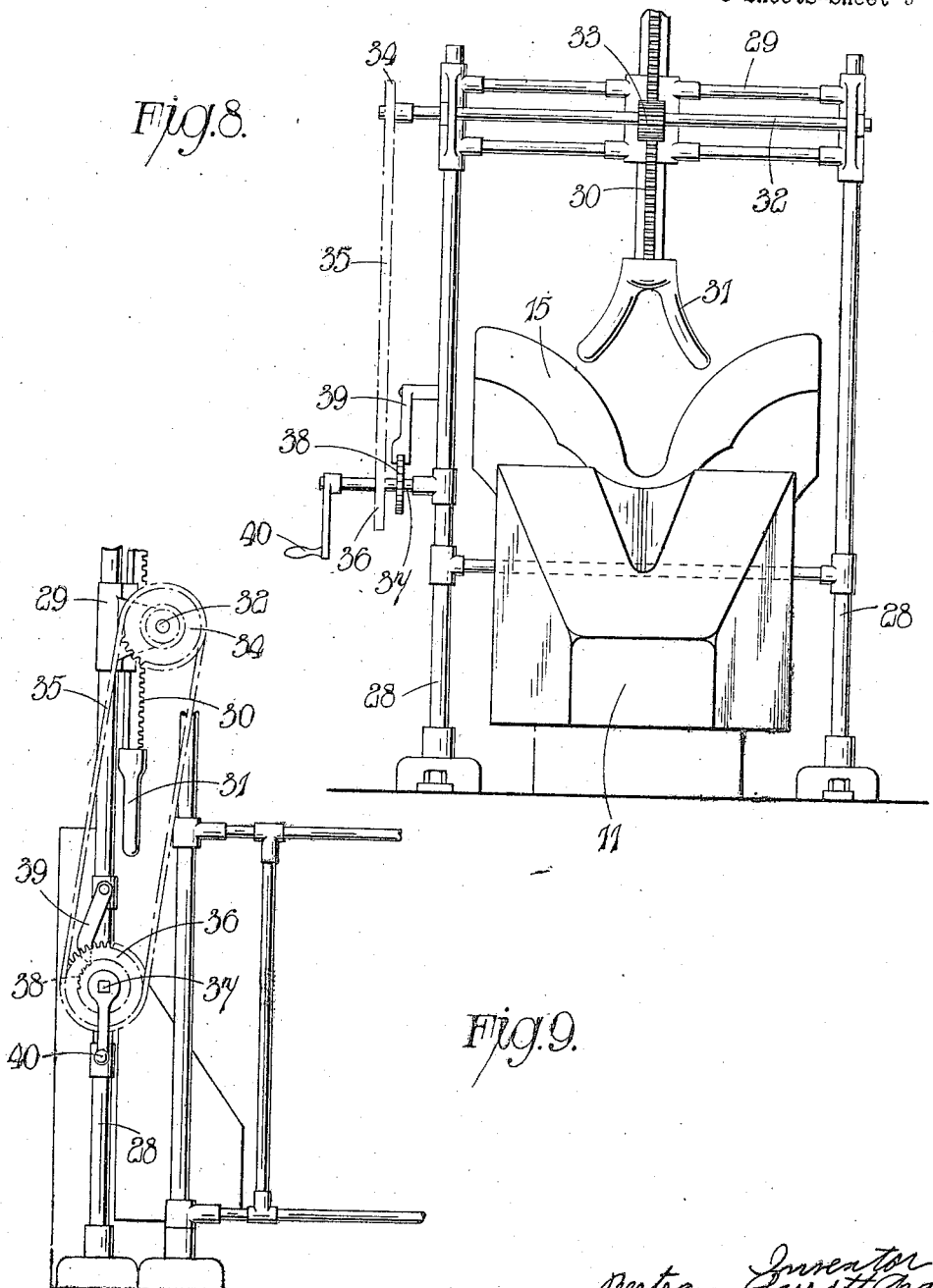

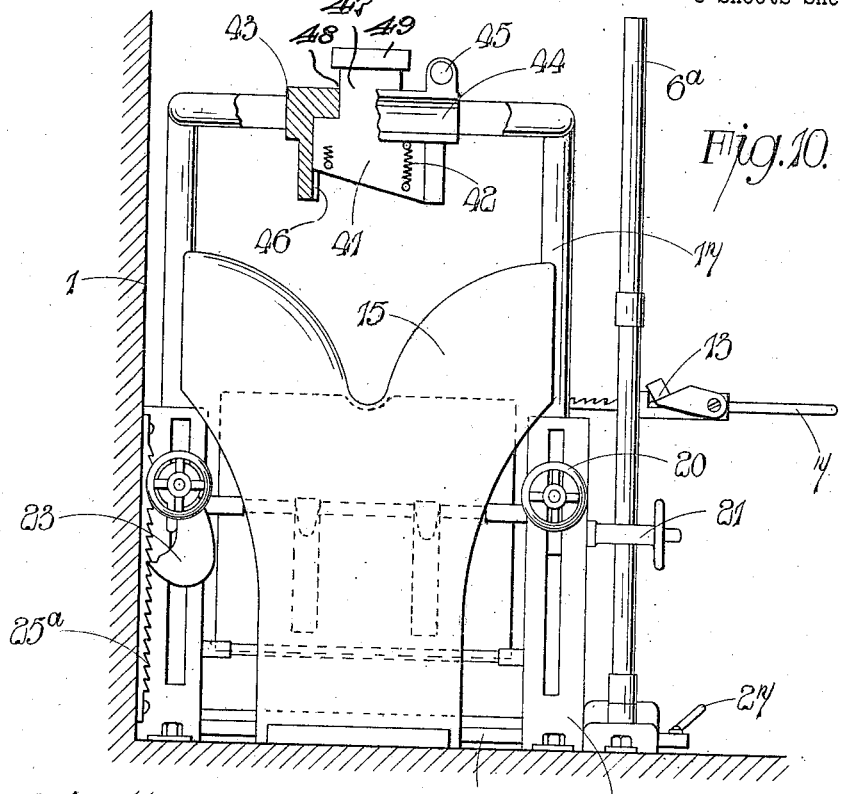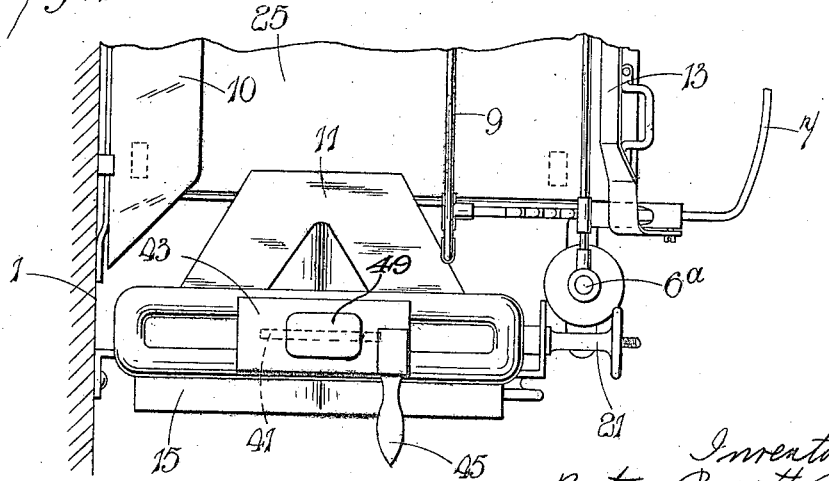

Patented Mar. 25, 1924.

1,487,935

UNITED STATES PATENT OFFICE.

BERTRAM PARROTT GRAY, OF SUTTON COLDFIELD, ENGLAND.

APPARATUS FOR SLAUGHTERING CATTLE.

Application filed August 21, 1923. Serial No. 658,623.

*To all whom it may concern:*

Be it known that I, BERTRAM PARROTT GRAY, a subject of the King of Great Britain, residing at "Ellangowan," Bishops Road, Sutton Coldfield, in the county of Warwick, England, have invented certain new and useful Improvements in or Relating to Apparatus for Slaughtering Cattle; and I do hereby declare the following to be a full, clear, and exact description of the same.

This invention relates to apparatus for slaughtering cattle and has for its object to provide apparatus whereby the operation may be carried out in as humane a manner as possible and whereby the danger of wounding the animal without either rendering it unconscious or killing it practically instantaneously can be avoided.

Various methods are at present in use for slaughtering cattle and in most but not all of these methods the animal is either shot or struck on the head in a manner either to kill it instantaneously or to render it unconscious. The danger of wounding the animal without rendering it unconscious or killing it arises usually from the possibility of the animal moving its head or inaccuracy of the slaughterman.

The primary feature of the present invention therefore consists in the provision of a stall or enclosure for the animal whereby the body of the animal and particularly its head can be held and retained in a definite position so that inaccuracies in performing the killing operation are reduced to a minimum.

Apparatus according to the present invention comprises a stall having side and end walls at least one of which can be opened to permit the animal to enter and one or more of which can be adjusted to retain the animal in a definite position, means being provided at one end of the stall for holding and retaining the head of the animal in a definite position whilst it is killed.

A further object of the present invention is to facilitate the operation of removing the carcase after the animal is killed and in carrying out this part of my invention it is preferred to make one of the sides of the stall movable or detachable and to form the floor of the stall as a movable platform which can either be run out either laterally or endwise, bearing the carcase thereon.

The means for holding and retaining the head of the animal in a definite position preferably comprise a fixed or adjustable block at one end of the stall over which the animal is constrained to place its head and a yoke or member arranged above the head of the animal which can be drawn down and adjusted to hold the head securely.

I may combine with this yoke or member a slaughtering blade or hammer or other suitable instrument which can be struck with a hammer or otherwise operated to perform the killing operation.

Referring to the drawings:—

Figure 5 is a view of the stall looking from the rear.

Figure 6 is a perspective view of a detachable block employed at the side of the stall.

Figure 7 is a perspective view of a detachable block employed at the front of the stall.

Figure 8 is a view of the front of the stall looking from the rear showing a modified form of the apparatus for retaining the animal's head.

Figure 9 is a side view of the apparatus shown in Figure 8.

Figure 10 is a front view partly in section of a portion of the yoke member fitted with a blade for use in slaughtering.

Figure 11 is a plan view thereof.

Figure 1:
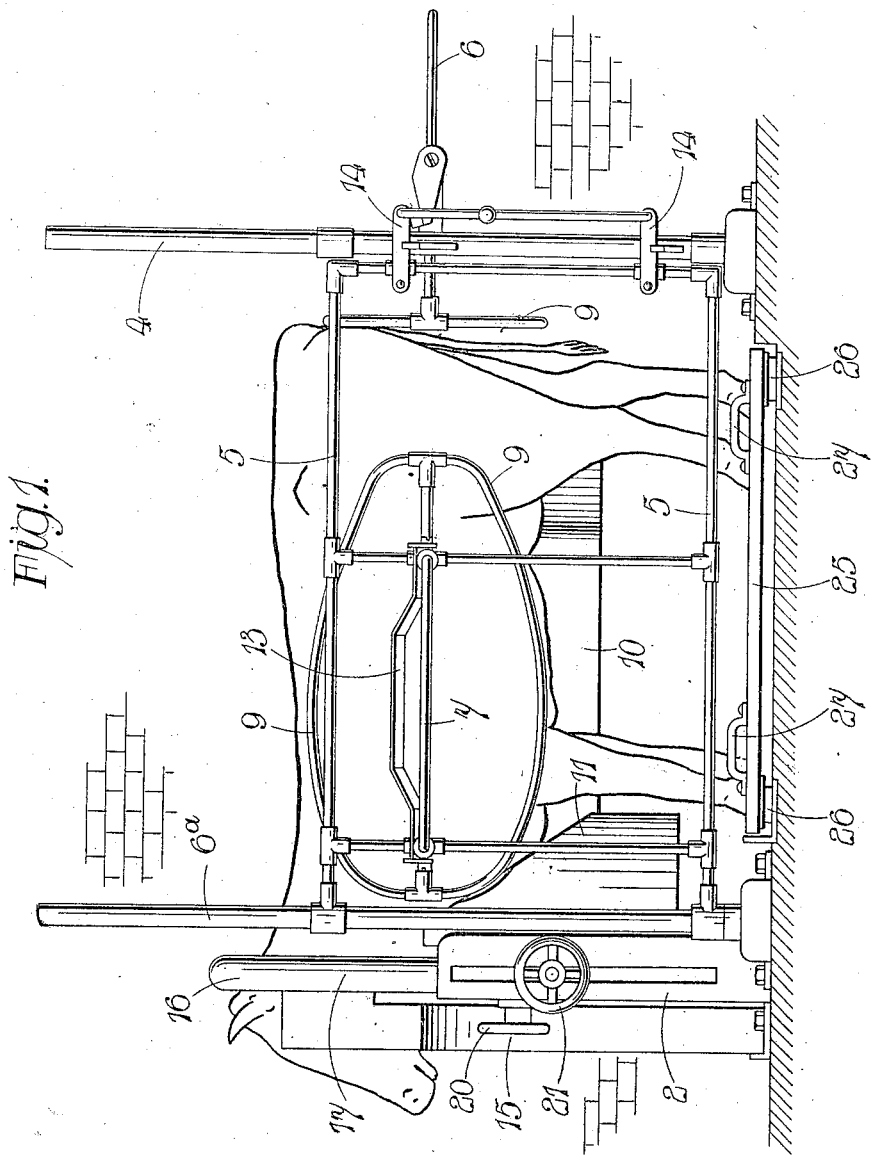
Figure 1 is a view in side elevation.

In the construction illustrated the stall is formed by a wall 1 at one side which may be of brick or any other suitable material. The front of the stall is formed by a comparatively low wall 2 whilst the rear is formed by means of a gate 3 hinged to a vertical post 4 and the remaining side is formed by a gate 5 hinged to a vertical post 6ª.

The rear and side gates 3 and 5 are provided with adjustable frames 6 and 7 respectively. The frames 6 and 7 can slide in bearings 8 provided in their respective gates and at their forward ends the frames 6 and 7 are provided with locating frames 9. The arrangement is such that either of the frames 6 or 7 can be moved inwards or outwards so that after the animal has been driven into the stall, its position can be definitely located by means of the frames 9. One of the frames 9 operates to press the animal up against a shaped side block 10 whilst the rear frame 9 operates to press the animal up against a shaped front block 11. The frames 6 and 7 can be pushed inwardly by hand and they are provided with ratchet teeth 12 and ratchet members 13 which engage with these teeth to prevent the frames 6 or 7 being pushed back once they have been adjusted.

Suitable fastenings such as 14 are provided for each of the gates 3 and 5.

In advance of the wall 2 is a block 15 and each of the blocks 11 and 15 have V shaped openings which are shaped to suit the neck of the animal. The blocks 10, 11 and 15 are all arranged to hook on to the adjacent stationary parts of the stall. These blocks may be made of wood or any other suitable material.

Figure 2:
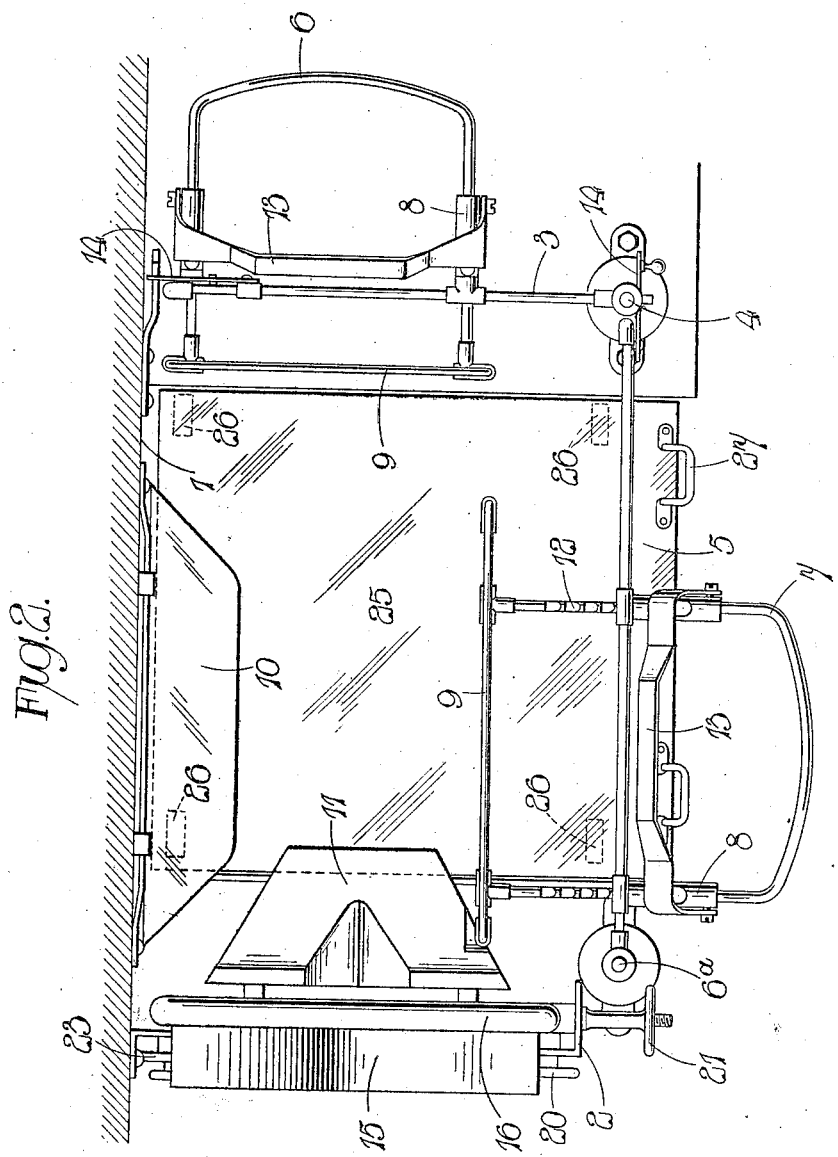
Figure 2 is a view in plan.
Figure 3:
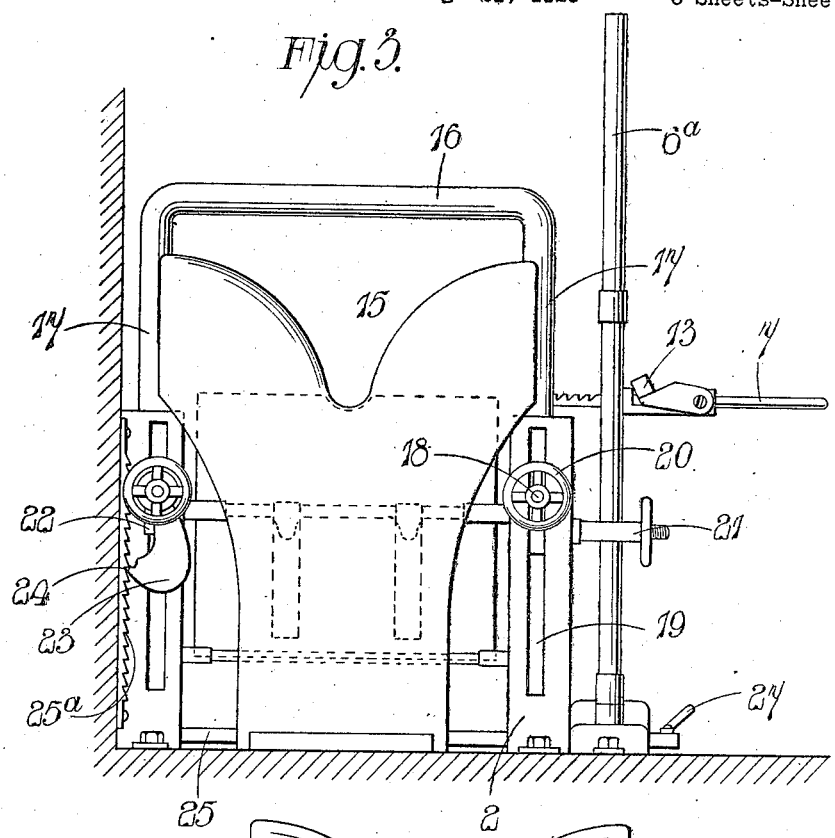
Figure 3 is an end view.
Figure 4:
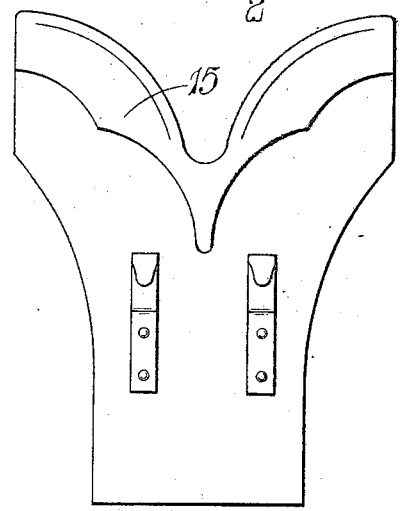
Figure 4 is a view looking at the rear side of one of the blocks employed at the front of the stall.

Between the blocks 11 and 15, which both hook on to the wall 2, and associated with the wall 2 is arranged a yoke member 16 which can be adjusted up and down by hand. The arrangement shown in Figures 1, 2 and 3 includes sliding parts 17 of the yoke 16, one part 17 being provided with a projecting stud 18 which slides in a slot 19 in the wall 2. The stud 18 is provided with a hand wheel 20 which can be screwed in to lock the yoke 16 in any desired position. One of the sliding parts 17 is provided with a laterally projecting handle 21 by which the yoke may be lifted and lowered whilst the other sliding member 17 is provided with a lever 22 acting upon a pawl 23, the shaping of which causes its nose 24 to engage with a ratchet rack 25$^a$. Thus as the yoke 16 is lowered the pawl 23 prevents it being raised again by the animal tossing its head.

The animal is driven usually through the gate 3, the two locating frames 9 being withdrawn. When the animal is in the stall the frames 6 and 7 carrying the frames 9 are advanced until the animal is held securely against the blocks 10 and 11 with its head disposed in the position shown in Figure 1. The yoke 16, which has previously been raised, is now lowered to retain the head stationary when the killing operation can be performed without any appreciable risk of head movement leading to inaccuracy.

The floor 25 of the stall is movable and may be provided with rollers 26 and handles 27 which allow the carcase to be slidden out from the stall laterally. The floor may be given a slight tilt in the direction of movement in order to make it easy of withdrawal.

A modified arrangement of yoke is shown in Figures 8 and 9 wherein upon posts 28 is slidably placed a yoke frame 29 provided with a sliding rack 30. The lower end of the rack 30 is provided with a yoke 31.

Transversely mounted between the standards 28 is a shaft 32 upon which is a pinion 33 gearing with the rack 30.

Upon the end of the shaft 32 is a sprocket 34 geared by a chain 35 or other means with a sprocket 36 upon a short shaft 37. The shaft 37 is provided with a ratchet wheel 38 with which operates a pawl 39 to prevent the animal from lifting the yoke 31. The shaft 37 is turned by a handle 40 to raise or lower the yoke 31.

In Figures 10 and 11 the upper transverse member 16 of the yoke 17 is made in the form of a closed loop of rectangular shape. This member 16 carries a slaughtering appliance in the form of a blade or hammer. The appliance is carried by a frame 43 which is provided with two horizontally disposed recesses 44, located one on each side thereof, whereby the frame is slidably mounted within the loop member 16 with the two longitudinal side members thereof engaging in the recesses. A handle 45 is provided to enable the frame to be easily moved. The frame 43 is hollow and receives the blade or hammer 41 which slides in guides 46 in the frame. This blade or hammer is provided with a shank portion 47 which passes upwardly through a hole 48 in the frame and is provided at its upper end with an enlarged head 49 which is adapted to be struck by a hammer or otherwise moved downwards with force. The blade or hammer 41 is returned after it has been moved with force by the springs 42 which extend between the frame and the blade or hammer 41.

In operation, the yoke 17 is lowered and the frame moved until the blade or hammer 41 is in the desired position above the animal's head, when the said blade or hammer is driven with force on to the animal's head to effect the slaughtering operation.

It is to be understood that this invention is applicable for slaughtering animals generally whether oxen, pigs, sheep or other animals.

What I claim then is:—

1. Apparatus for slaughtering cattle comprising in combination a stall, means movable laterally against the side of the body of the animal; means movable against the rear of the body of the animal; and means for holding the head and neck of the animal stationary during slaughtering operation.

2. Apparatus for slaughtering cattle comprising in combination a stall; means movable laterally against the side of the body of the animal; means movable against the rear of the body of the animal; and a block having two longitudinally spaced portions, one of which engages the neck of the animal and the other engages with the animal's head to hold it stationary during the slaughtering operation.

3. Apparatus for slaughtering cattle comprising in combination a stall; means movable laterally against the side of the body of the animal; means movable against the rear of the body of the animal; a block to engage the neck of the animal and prevent it moving forwardly beyond a definite position; and a block to engage with the animal's head and hold it stationary during the slaughtering operation.

4. Apparatus for slaughtering cattle comprising in combination a stall, a gate forming one side of the stall an adjustable locating frame mounted on said gate and whereby the animal may be pressed into a definite position in said stall and retained in such position; and means for holding the head and neck of the animal stationary during slaughtering operation.

5. Apparatus for slaughtering cattle comprising in combination a stall; a gate forming one side of said stall, an adjustable locating frame carried by the gate and whereby the animal may be pressed into a definite position in said stall and retained in such position; a block to engage the neck of the animal and prevent it moving forwardly beyond a definite position; and a block to engage with the animal's head and hold it stationary during the slaughtering operation.

6. Apparatus for slaughtering cattle comprising in combination a stall; means movable laterally against the side of the body of the animal; means movable against the rear of the body of the animal; a movable yoke member adapted to be moved on to the head of the animal; and means for retaining the yoke member against upward or sideward movement of the animal's head whereby the animal's head is held stationary.

7. Apparatus for slaughtering cattle comprising in combination a stall; means movable laterally against the side of the body of the animal; means movable against the rear of the body of the animal; means for holding the head and neck of the animal stationary during slaughtering operation; and means for removing the animal from the stall after it has been slaughtered.

8. Apparatus for slaughtering cattle comprising a stall having a side which can be opened to admit the animal; locating members associated with the sides of said stall adapted to retain the animal in a definite position therein; a front block on the front end of said stall adapted to locate the neck of the animal; a head block in advance of said front block adapted to receive the head of the animal; and a yoke adapted to be moved on to the top of the animal's head to retain it on the head block and thereby hold it stationary during the slaughtering operation.

9. Apparatus for slaughtering cattle comprising a stall having a side which can be opened to admit the animal; a locating block on one side of said stall; a front block on the front end of said stall adapted to locate the neck of the animal; adjustable locating frames on the remaining sides of said stall adapted to force the body of the animal against the locating and front blocks and thereby retain the body in a definite position in the stall; a head block in advance of said front block adapted to receive the head of the animal; and a yoke adapted to be moved on to the top of the animal's head to retain it on the head block and thereby hold it stationary during the slaughtering operation.

10. Apparatus for slaughtering cattle comprising a stall; means retaining the body of the animal in a definite position within said stall; a block for supporting the animal's head; a yoke slidably mounted above said block adapted to be moved down on to the animal's head to retain it on the block and thereby hold it stationary during the slaughtering operation; and means to prevent the yoke from being raised by the animal.

11. Apparatus for slaughtering cattle comprising a stall; means for retaining the body of the animal in a definite position within said stall; a block for supporting the animal's head; a yoke slidably mounted above said block adapted to be moved down on to the animal's head to retain it on the block and thereby hold it stationary during the slaughtering operation; means to prevent the yoke from being raised by the animal; a frame slidably mounted on said yoke whereby it can be brought into the desired position above the animal's head; and a slaughtering appliance slidably mounted in said frame and adapted to be moved by force on to the animal's head to effect the slaughtering operation.

12. Apparatus for slaughtering cattle comprising a stall having movable sides to admit the animal and also allow the body to be moved after it has been slaughtered; means movable laterally against the side of the body of the animal; means movable against the rear of the body of the animal; means for holding the head and neck of the animal stationary during slaughtering operation; and a movable floor which can be slidden out of one of the sides of the stall after the side has been moved to remove the carcase from the stall.

13. Apparatus for slaughtering cattle comprising a stall having movable sides to admit the animal and also allow the body to be moved after it has been slaughtered; a locating block on one side of said stall; a front block in the front end of said stall adapted to locate the neck of the animal;

adjustable locating frames on the remaining sides of said stall adapted to force the body of the animal against the locating and front blocks and thereby retain the body in a definite position in the stall; a head block in advance of said front block adapted to receive the head of the animal; a yoke adapted to be moved on to the top of the animal's head to retain it on the head block and thereby hold it stationary during the slaughtering operation; a yoke slidably mounted above said block adapted to be moved down on to the animal's head to retain it on the block and thereby hold it stationary during the slaughtering operation; means to prevent the yoke from being raised by the animal; and a movable floor which can be slidden out of one of the sides of the stall after the side has been moved to remove the carcase from the stall.

In witness whereof I affix my signature.

BERTRAM PARROTT GRAY.